United States Patent
Tanaka et al.

(10) Patent No.: US 10,209,952 B2
(45) Date of Patent: Feb. 19, 2019

(54) CONTENT REPRODUCTION DEVICE, CONTENT REPRODUCTION SYSTEM, AND CONTROL METHOD FOR A CONTENT REPRODUCTION DEVICE

(71) Applicant: Yamaha Corporation, Hamamatsu-shi, Shizuoka (JP)

(72) Inventors: Katsuaki Tanaka, Hamamatsu (JP); Akihiko Suyama, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 15/709,515

(22) Filed: Sep. 20, 2017

(65) Prior Publication Data
US 2018/0088898 A1    Mar. 29, 2018

Related U.S. Application Data

(63) Continuation of application No. PCT/JP2016/078054, filed on Sep. 23, 2016.

(51) Int. Cl.
*G06F 3/16* (2006.01)

(52) U.S. Cl.
CPC ........ *G06F 3/165* (2013.01); *G06F 2211/005* (2013.01)

(58) Field of Classification Search
CPC ...... G06F 3/00; G06F 3/165; G06F 2211/005; G06F 17/10; G06F 15/16
USPC ................. 700/94; 709/219, 238; 369/85, 7
See application file for complete search history.

(56) References Cited

U.S. PATENT DOCUMENTS

| | | | |
|---|---|---|---|
| 2003/0028539 A1* | 2/2003 | Nunome | G06F 17/30749 |
| 2011/0113123 A1* | 5/2011 | Takagaki | G11B 27/105 |
| | | | 709/219 |
| 2012/0011550 A1 | 1/2012 | Holland | |
| 2016/0291925 A1 | 10/2016 | Kohara et al. | |

FOREIGN PATENT DOCUMENTS

| | | | |
|---|---|---|---|
| JP | 2009-237470 A | | 10/2009 |
| JP | 2009237470 A | * | 10/2009 |
| JP | 2012-175178 A | | 9/2012 |
| JP | 2015-64924 A | | 4/2015 |
| JP | 2015-100085 A | | 5/2015 |

OTHER PUBLICATIONS

International Search Report (PCT/ISA/210) issued in PCT Application No. PCT/JP2016/078054 dated Nov. 1, 2016 with partial unverified English translation (4 pages).

Japanese-language Written Opinion (PCT/ISA/237) issued in PCT Application No. PCT/JP2016/078054 dated Nov. 1, 2016 with partial unverified English translation (6 pages).

* cited by examiner

Primary Examiner — Melur Ramakrishnaiah
(74) Attorney, Agent, or Firm — Crowell & Moring LLP

(57) ABSTRACT

A control method for a content reproduction device includes: receiving, from a second content reproduction device connected through a network, acquisition source information on content included in a playlist of the second content reproduction device; and determining whether or not reproduction of the content is possible.

14 Claims, 8 Drawing Sheets

FIG.10

| TYPE | WHETHER OR NOT ACQUISITION OF CONTENT SOURCE BASED ON OWN ACQUISITION SOURCE INFORMATION IS POSSIBLE | WHETHER OR NOT ACQUISITION OF CONTENT SOURCE BASED ON ACQUISITION SOURCE INFORMATION RECEIVED FROM ANOTHER DEVICE IS POSSIBLE | WHETHER OR NOT REPRODUCTION OF CONTENT BASED ON ACQUISITION SOURCE INFORMATION RECEIVED FROM ANOTHER DEVICE IS POSSIBLE |
|---|---|---|---|
| INTERNET RADIO | POSSIBLE | POSSIBLE | POTENTIALLY POSSIBLE |
| CONTENT DISTRIBUTION SERVICE A | POSSIBLE | POSSIBLE | POTENTIALLY POSSIBLE |
| CONTENT DISTRIBUTION SERVICE B | POSSIBLE | IMPOSSIBLE | POTENTIALLY POSSIBLE |
| CONTENT DISTRIBUTION SERVICE C | IMPOSSIBLE | IMPOSSIBLE | IMPOSSIBLE |
| USB | POSSIBLE | IMPOSSIBLE | IMPOSSIBLE |

# CONTENT REPRODUCTION DEVICE, CONTENT REPRODUCTION SYSTEM, AND CONTROL METHOD FOR A CONTENT REPRODUCTION DEVICE

CROSS-REFERENCE TO RELATED APPLICATION

This application is a continuation of PCT International Application No. PCT/JP2016/078054, filed Sep. 23, 2016, the entire disclosure of which are herein expressly incorporated by reference in its entirety.

BACKGROUND OF THE INVENTION

1. Field of the Invention

The present invention relates to a content reproduction device, a content reproduction system, and a control method for a content reproduction device.

2. Description of the Related Art

In Japanese Patent Application Laid-open No. 2015-100085, there is disclosed a content reproduction system including a plurality of content reproduction devices connected to a smartphone through a network. One of the plurality of content reproduction devices is set as a parent device, while the other content reproduction devices are set as child devices. When a user performs an operation for starting reproduction on the smartphone, a list of music data is displayed. When the user selects apiece of music data to be reproduced, the smartphone notifies the parent device of information on the selected piece of music data. The parent device notifies the child device of storage information on the piece of music data to be reproduced, which has been received from the smartphone, to allow the plurality of content reproduction devices to conduct the reproduction.

SUMMARY OF THE INVENTION

In the related-art content reproduction device, musical pieces that can be selected by the user are limited to musical pieces that can be reproduced by the content reproduction device itself set as the parent device.

The present disclosure has been made in view of the above-mentioned problem, and has an object to improve a possibility of reproducing content included in a playlist of a second content reproduction device.

A content reproduction device according to one embodiment of the present disclosure includes: a communication unit configured to receive, from a second content reproduction device connected through a network, acquisition source information on content included in a playlist of the second content reproduction device; and a control unit configured to determine whether or not reproduction of the content is possible.

A content reproduction system according to one embodiment of the present disclosure includes: a first content reproduction device including a first playlist; and a second content reproduction device including a second playlist and connected to the first content reproduction device through a network, the first content reproduction device including a control unit configured to: receive acquisition source information on content included in the second playlist from the second content reproduction device; and determine whether or not reproduction of the content is possible.

A control method for a content reproduction device according to one embodiment of the present disclosure includes: receiving, from a second content reproduction device connected through a network, acquisition source information on content included in a playlist of the second content reproduction device; and determining whether or not reproduction of the content is possible.

BRIEF DESCRIPTION OF THE DRAWINGS

FIG. 10 is a correspondence table for showing whether or not reproduction of a musical piece is possible on the first content reproduction device according to this embodiment.

DETAILED DESCRIPTION OF THE INVENTION

[First Embodiment]

Referring to the accompanying drawings, an embodiment of the present disclosure is now described.

Figure 1:
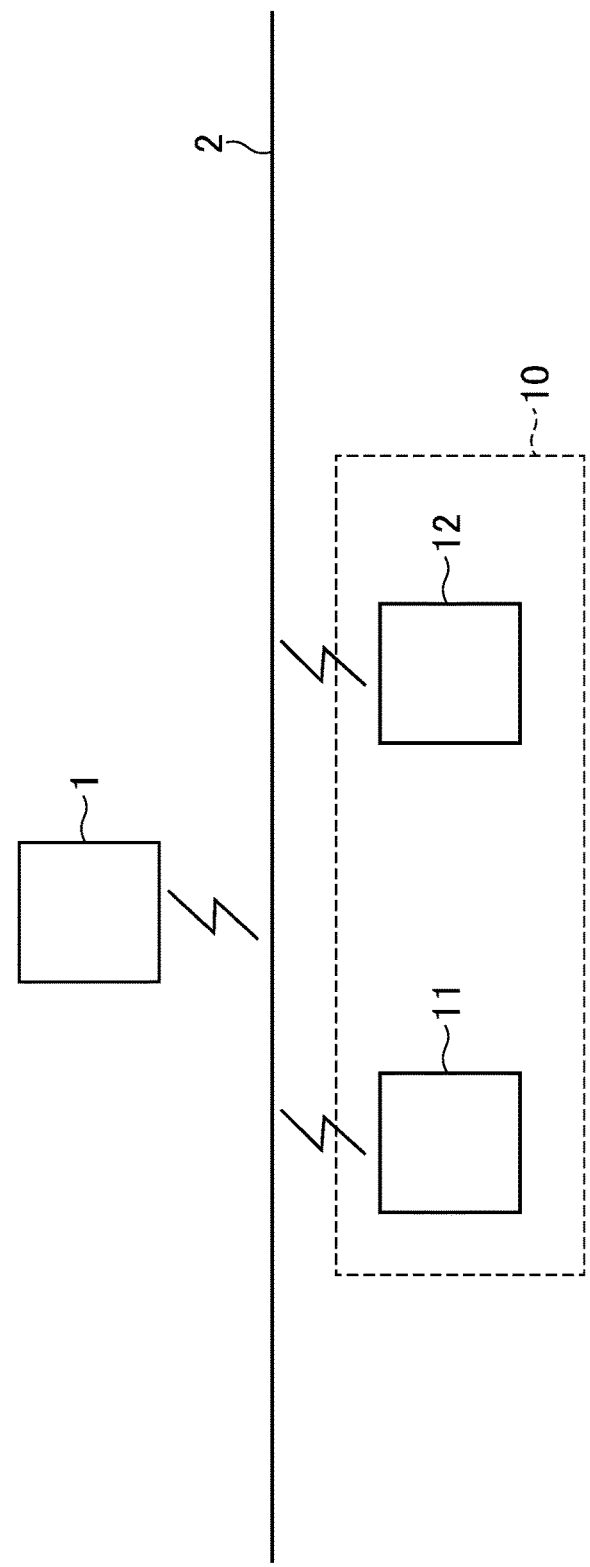
FIG. 1 is a conceptual diagram of a content reproduction system according to an embodiment of the present invention.

FIG. 1 is a conceptual diagram of a content reproduction system 10 according to this embodiment.

The content reproduction system 10 includes a first content reproduction device 11 and a second content reproduction device 12. The first content reproduction device 11 and the second content reproduction device 12 are connected to a controller 1 through a network 2. The first content reproduction device 11 is arranged in a living room, and the second content reproduction device 12 is arranged in a Western-style room. In one embodiment of the present disclosure, the content includes, for example, video, sound, and text.

The controller 1 is a computer, for example, a smartphone, a tablet computer, a personal computer, or a dedicated controller, and is a device capable of being connected to the network 2 and controlling the first content reproduction device 11 and the second content reproduction device 12. The controller 1 is also configured to execute Step S1 of transmitting a favorite list request signal and Step S3 of transmitting a reproduction instruction signal, which are described later, based on a program. The program may be installed from a recording medium of an optical type, a magnetic type, or any other such type, or may be downloaded via the Internet.

The network 2 includes a wireless local area network (LAN), a wired LAN, or a wide area network (WAN), and is used as a signal transmission path between the controller 1, the first content reproduction device 11 and the second content reproduction device 12. When the controller 1 is a smartphone or a tablet computer, it is desired that the network 2 include a wireless LAN of wireless-fidelity (Wi-Fi; trademark), for example.

Next, the first content reproduction device 11 is described with reference to FIG. 2.

Figure 2:
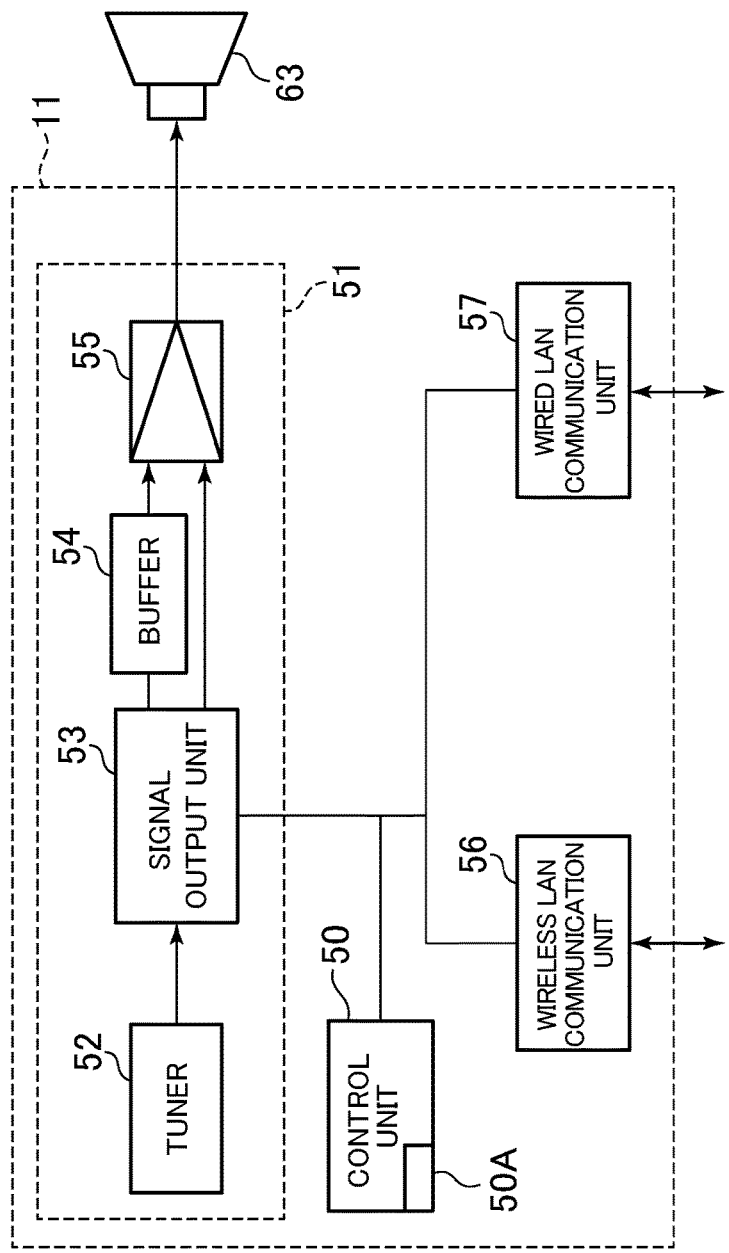
FIG. 2 is a block diagram of a first content reproduction device within the content reproduction system according to this embodiment.

FIG. 2 is a block diagram of the first content reproduction device 11 within the content reproduction system 10 according to this embodiment.

As illustrated in FIG. 2, the first content reproduction device 11 is an audio device configured to reproduce audio, a video reproduction device configured to reproduce a moving image or other such video content, or the like, and includes a control unit 50, a content processing unit 51 connected to a speaker 63, a wireless LAN communication unit 56, and a wired LAN communication unit 57. The content processing unit 51 may include the speaker 63. The first content reproduction device 11 is a computer configured to execute Step S4 of transmitting an acquisition source information request signal, Step S6 of referring to a correspondence table, Step S7 of determining whether or not reproduction is possible, Step S8 of transmitting a child device instruction signal, Step S9 of distribution, and Step S10 of transmitting a parent device instruction signal, which are described later, based on a content reproduction program 50A. The content reproduction program 50A may be installed from a recording medium of an optical type, a magnetic type, or any other such type, or may be downloaded via the Internet.

The control unit 50 includes a CPU and a memory, and stores the content reproduction program 50A. The control unit 50 is configured to control operations of the content processing unit 51, the wireless LAN communication unit 56, and the wired LAN communication unit 57 in accordance with the content reproduction program 50A. The control unit 50 is further configured to transmit/receive a signal to/from the controller 1 and the second content reproduction device 12 through the network 2.

The memory included in the control unit 50 is, for example, an EEPROM, and stores list information on a "favorite" being a shortcut to content registered by a user A, a link destination of the shortcut registered in the favorite, and the like.

The wireless LAN communication unit 56 is capable of conducting wireless communications to/from the controller 1 and the second content reproduction device 12.

The wired LAN communication unit 57 includes a cable connector, and is capable of conducting wired communications to/from the controller 1 and the second content reproduction device 12.

The content processing unit 51 includes a tuner 52, a signal output unit 53, a buffer 54, and a power amplifier 55. The tuner 52 is configured to receive a content source of the content from an FM broadcast or the like, and to input the content source to the signal output unit 53. The control unit 50 is also configured to receive the content source of the content through the network 2 via any one of the wireless LAN communication unit 56 and the wired LAN communication unit 57, and to input the content source to the signal output unit 53.

The signal output unit 53 is configured to reproduce the content based on the input content source. The signal output unit 53 is configured to reproduce the content via the buffer 54 or not via the buffer 54. It is determined whether or not the signal output unit 53 is to reproduce the content via the buffer 54 based on whether the first content reproduction device 11 is a parent device or a child device with respect to the second content reproduction device 12. Details thereof are described later.

The signal output unit 53 is capable of generating a streaming signal based on the content source in response to an instruction issued by the control unit 50, and outputting the streaming signal to the wireless LAN communication unit 56 or the wired LAN communication unit 57. The signal output unit 53 is also capable of acquiring the streaming signal generated by the second content reproduction device 12 and transmitted from the second content reproduction device 12 via the wireless LAN communication unit 56 or the wired LAN communication unit 57.

The buffer 54 is capable of synchronizing the reproduction on the first content reproduction device 11 with the reproduction on the second content reproduction device 12 by delaying the reproduction of the content conducted by the signal output unit 53 by a predetermined time period. The time period for the delay is set based on a communication time period of the streaming signal between the first content reproduction device 11 and the second content reproduction device 12.

The power amplifier 55 is configured to amplify the input signal of the content, and to output the signal to the externally connected speaker 63.

The speaker 63 is configured to output the signal of the content amplified by the power amplifier 55 as sound.

In this embodiment, the second content reproduction device 12 is an audio device configured to reproduce audio, a video reproduction device configured to reproduce a moving image or other such video content, or the like, and has substantially the same configuration as that of the first content reproduction device 11 described above, and hence a detailed description relating to the configuration is omitted. The second content reproduction device 12 is a computer configured to execute Step S2 of submitting a favorite list, Step S5 of submitting acquisition source information, and Step S11 of distribution, which are described later, based on the content reproduction program 50A. The content reproduction program 50A may be installed from a recording medium of an optical type, a magnetic type, or any other such type, or may be downloaded via the Internet.

Next, with reference to FIG. 3 to FIG. 10, an operation of the content reproduction system 10 according to one embodiment of the present disclosure is described.

Figure 3:
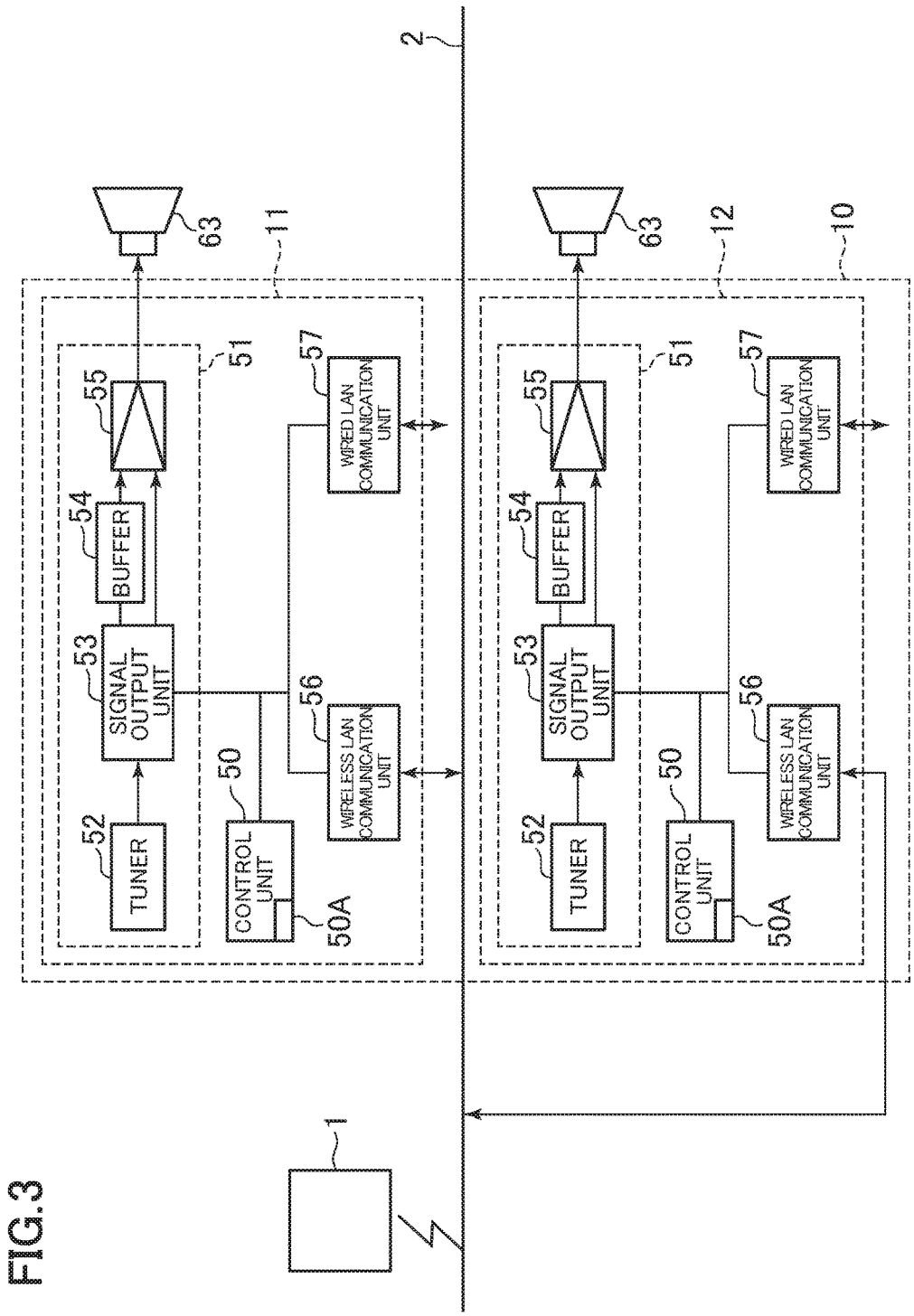
FIG. 3 is a block diagram of the content reproduction system according to this embodiment.

FIG. 3 is a block diagram of the content reproduction system 10 according to this embodiment.

FIG. 4 to FIG. 7 are conceptual diagrams for illustrating user interfaces of the controller 1 configured to control the content reproduction system 10 according to this embodiment.

Figure 8:
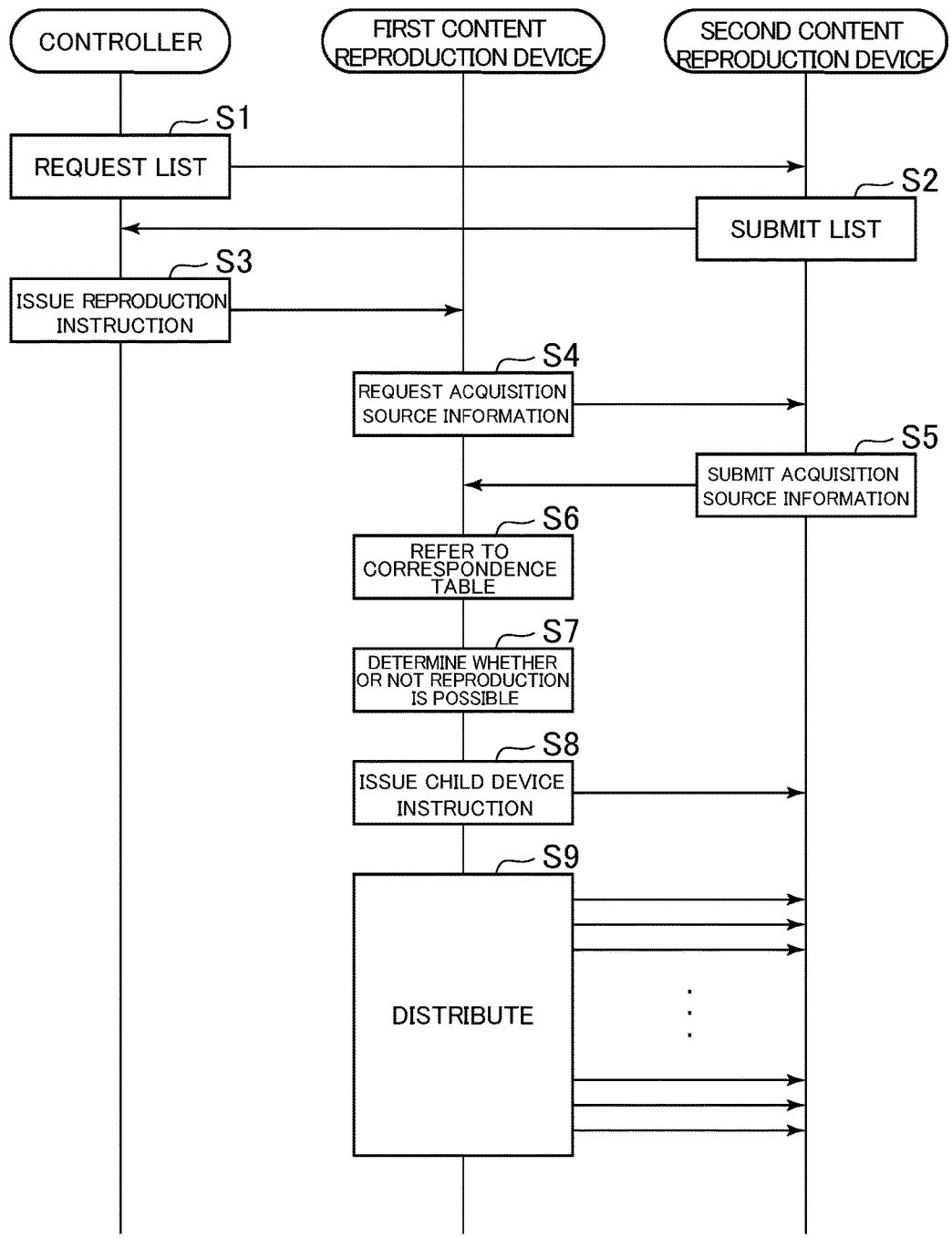
FIG. 8 is a sequence diagram of the content reproduction system according to this embodiment.
Figure 9:
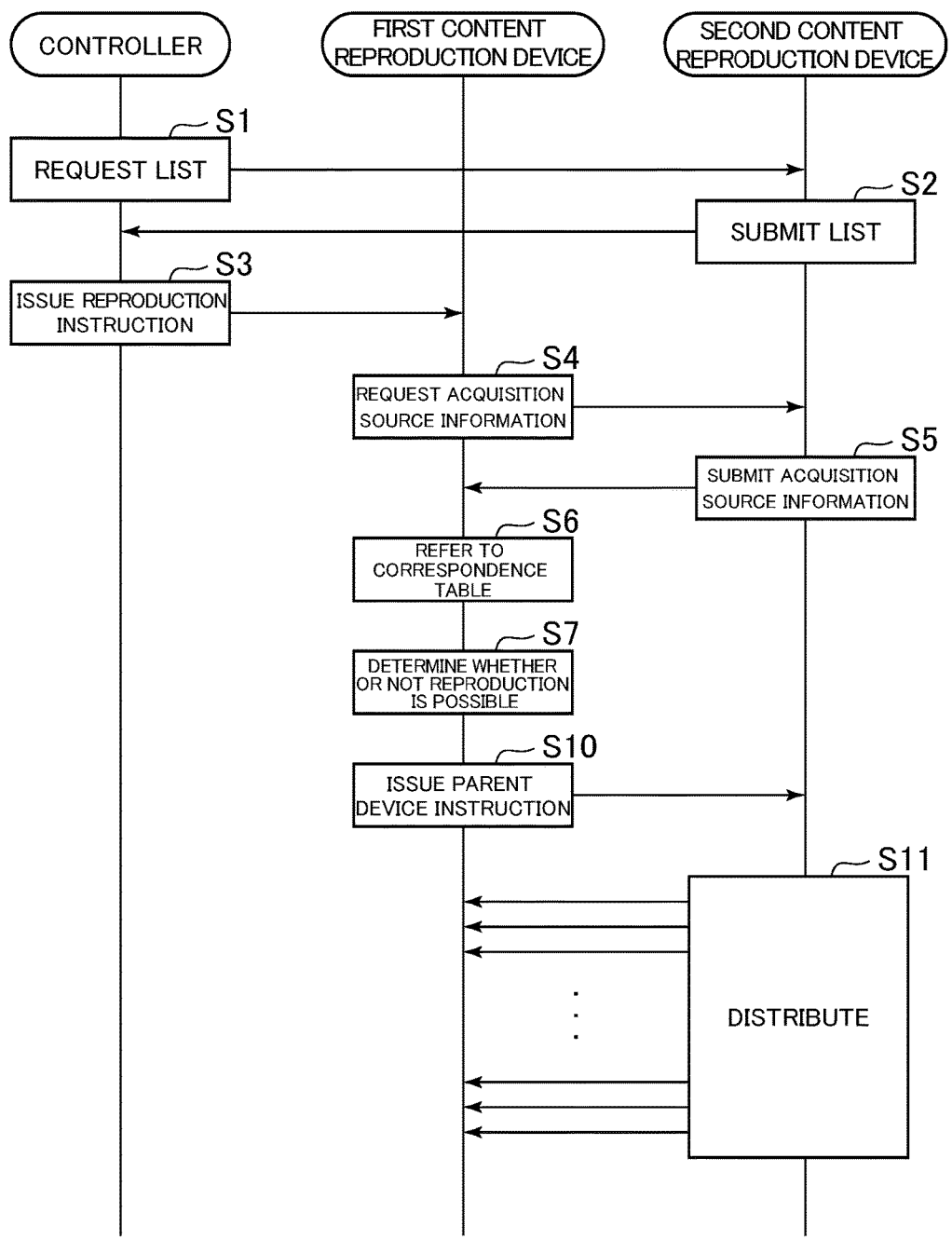
FIG. 9 is a sequence diagram of the content reproduction system according to this embodiment.

FIG. 8 and FIG. 9 are sequence diagrams of the content reproduction system 10 according to this embodiment.

FIG. 10 is a correspondence table for showing whether or not reproduction of a musical piece is possible on the first content reproduction device 11 according to this embodiment.

Operation Example 1 of Content Reproduction System 10

Figure 4:
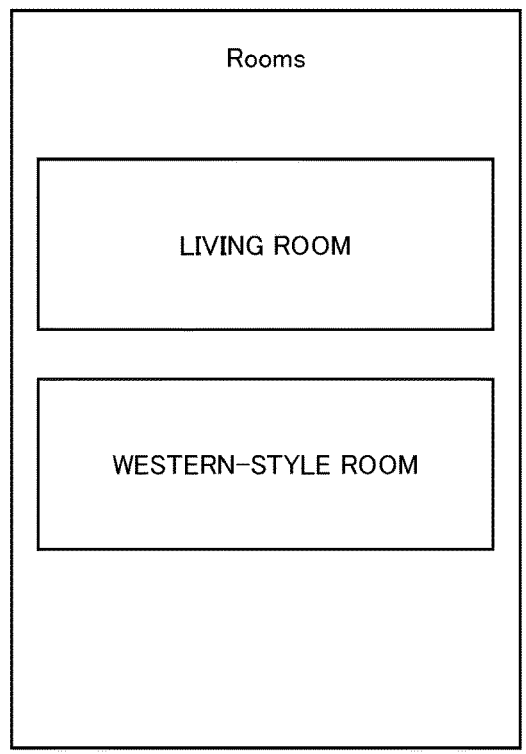
FIG. 4 is a conceptual diagram for illustrating a user interface of a controller configured to control the content reproduction system according to this embodiment.

In this embodiment, a smartphone is used as the controller 1, and displays a room selection screen as illustrated in FIG. 4 as an initial screen for controlling the content reproduction system 10. As illustrated in FIG. 4, a "living room" in which the first content reproduction device 11 is arranged and a "Western-style room" in which the second content reproduction device 12 is arranged can be selected on the room selection screen.

In this embodiment, when the user A is in the living room, the user A selects the "living room" on the room selection screen illustrated in FIG. 4. With this operation, the controller 1 recognizes the first content reproduction device 11 arranged in the living room as the parent device and the second content reproduction device 12 arranged in the Western-style room as the child device.

Figure 5:
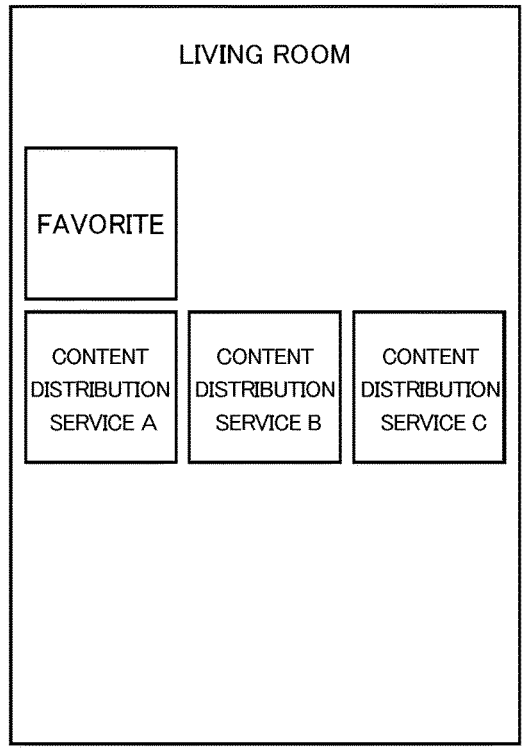
FIG. 5 is a conceptual diagram for illustrating a user interface of the controller configured to control the content reproduction system according to this embodiment.

Subsequently, the user A selects a service type to be used by himself or herself on such a service type selection screen as illustrated in FIG. 5. In this embodiment, a "favorite", a "content distribution service A", a "content distribution service B", and a "content distribution service C" can be selected on the service type selection screen. The "favorite" is a shortcut to the content stored on the first content reproduction device 11 and the second content reproduction device 12. The "content distribution service A", the "content distribution service B", and the "content distribution service C" are each a content distribution service that can be used on any one of the first content reproduction device and the second content reproduction device 12. In this embodiment, the first content reproduction device 11 can use the content distribution service A and the content distribution service B, and the second content reproduction device 12 can use the content distribution service C.

Figure 6:
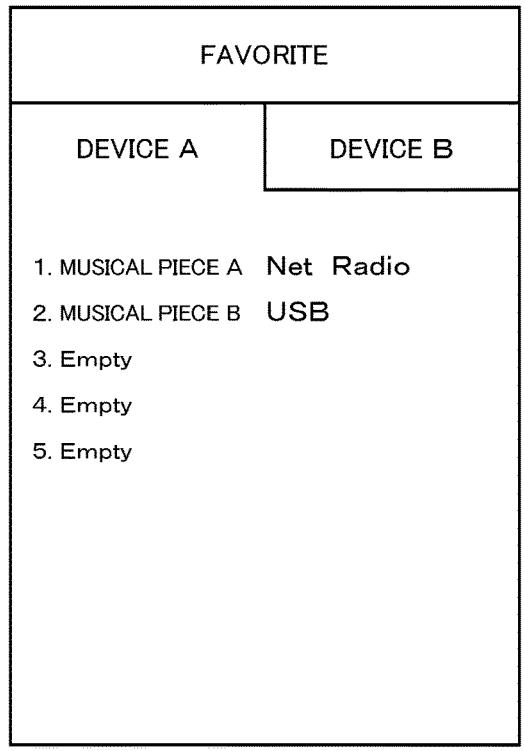
FIG. 6 is a conceptual diagram for illustrating a user interface of the controller configured to control the content reproduction system according to this embodiment.

In this embodiment, the user A selects the "favorite". When the user A selects "favorite" on the service type selection screen illustrated in FIG. 5, the screen is switched to a content selection screen illustrated in FIG. 6, and the favorite list stored on the first content reproduction device 11 is displayed. In FIG. 6, a "device A" means the first content reproduction device 11, and a "device B" means the second content reproduction device 12.

Now, a description is made of Step S1 of transmitting the favorite list request signal from the controller 1 to the second content reproduction device 12, which is illustrated in FIG. 8.

When the user A selects a tab for the "device B" on the content selection screen illustrated in FIG. 6, the controller 1 illustrated in FIG. 3 transmits the favorite list request signal to the second content reproduction device 12 through the network 2. In the second content reproduction device 12, the control unit 50 receives the favorite list request signal via the wireless LAN communication unit 56.

Next, a description is made of Step S2 of submitting the favorite list from the second content reproduction device 12 to the controller 1, which is illustrated in FIG. 8.

The control unit 50 of the second content reproduction device 12 illustrated in FIG. 3 transmits the favorite list stored in the memory to the controller 1 through the network 2 via the wireless LAN communication unit 56. When the controller 1 receives the favorite list, the favorite list of the second content reproduction device 12 is displayed on the content selection screen as illustrated in FIG. 7.

This embodiment is directed to an example in which, after the user A selects the tab for the "device B" illustrated in FIG. 6, the controller 1 transmits the favorite list request signal to the second content reproduction device 12, and receives the favorite list from the second content reproduction device 12. However, the controller 1 may be configured to receive the favorite list from the second content reproduction device 12 to store the favorite list in advance.

Next, a description is made of Step S3 of transmitting the reproduction instruction signal from the controller 1 to the first content reproduction device 11, which is illustrated in FIG. 8.

Figure 7:
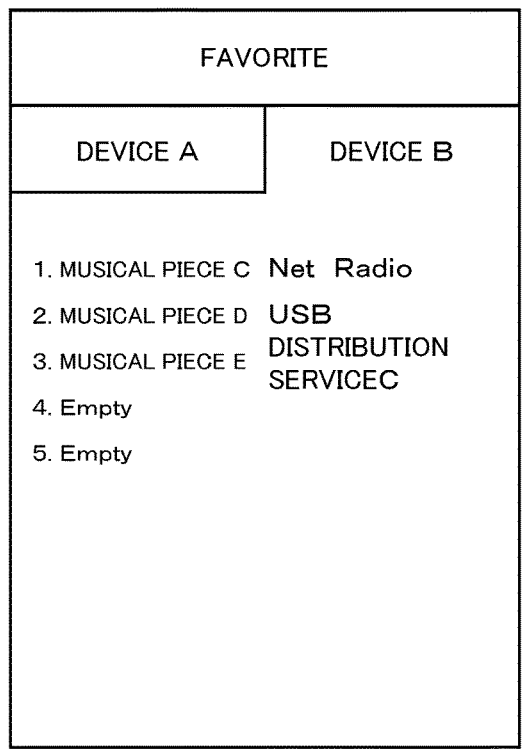
FIG. 7 is a conceptual diagram for illustrating a user interface of the controller configured to control the content reproduction system according to this embodiment.

In this operation example, the user A selects a musical piece C being content included in the favorite list of the second content reproduction device 12 illustrated in FIG. 7. Then, the controller 1 illustrated in FIG. 3 transmits the reproduction instruction signal to the first content reproduction device 11 through the network 2. The reproduction instruction signal is a signal for instructing the first content reproduction device 11 to reproduce content included in the favorite list of the second content reproduction device 12, and includes information indicating which position within the favorite list of the second content reproduction device 12 the content is described in. In this operation example, the reproduction instruction signal includes the information indicating that the musical piece C is described in the first place within the favorite list of the second content reproduction device 12. In the first content reproduction device 11, the control unit 50 receives the reproduction instruction signal via the wireless LAN communication unit 56.

Next, a description is made of Step S4 of transmitting the acquisition source information request signal from the first content reproduction device 11 to the second content reproduction device 12, which is illustrated in FIG. 8.

The acquisition source information is a link destination at which the content is stored. In this operation example, the acquisition source information is a link destination of the musical piece C on Internet radio. The first content reproduction device 11, which has received the reproduction instruction signal from the controller 1, transmits the acquisition source information request signal for requesting the acquisition source information on the content source of the musical piece C to the second content reproduction device 12. Specifically, the control unit 50 of the first content reproduction device 11 illustrated in FIG. 3 transmits the acquisition source information request signal to the second content reproduction device 12 through the network 2 via the wireless LAN communication unit 56. In the second content reproduction device 12, the control unit 50 receives the acquisition source information request signal via the wireless LAN communication unit 56.

Next, a description is made of Step S5 of submitting the acquisition source information from the second content reproduction device 12 to the first content reproduction device 11, which is illustrated in FIG. 8.

The control unit 50 of the second content reproduction device 12, which has received the acquisition source information request signal, extracts the acquisition source information stored in the memory of the control unit 50, and transmits the acquisition source information to the first content reproduction device 11 via the wireless LAN communication unit 56. In the first content reproduction device 11, the control unit 50 receives the acquisition source information via the wireless LAN communication unit 56.

Next, a description is made of Step S6 of referring to the correspondence table by the first content reproduction device 11, which is illustrated in FIG. 8.

The first content reproduction device 11, which has acquired the acquisition source information on the content from the second content reproduction device 12, determines whether or not the reproduction of the content is possible only on the first content reproduction device 11. That is, the first content reproduction device 11 determines whether or not the first content reproduction device 11 can acquire the content source of the content and can reproduce the content by itself. The first content reproduction device 11 first refers to the correspondence table shown in FIG. 10 to determine whether or not the first content reproduction device 11 can reproduce the content by itself. The correspondence table is stored in the memory included in the control unit 50.

In the first column of the correspondence table shown in FIG. 10, the type of content is described. In this embodiment, the Internet radio, the content distribution services A, B, and C, and a USB are included.

In the second column of the correspondence table, it is described whether or not the first content reproduction device 11 can acquire the content sources of various kinds of content based on the acquisition source information possessed by itself. In this embodiment, the first content reproduction device 11 is compatible with the Internet radio, the content distribution service A, the content distribution service B, and the USB, and can acquire the content sources of those kinds of content. However, in this embodiment, the first content reproduction device 11 is not compatible with the content distribution service C, and cannot acquire the content source of the content from the content distribution service C.

In the third column of the correspondence table, it is described whether or not the content source can be acquired based on the acquisition source information when the first content reproduction device 11 acquires the acquisition source information from another device. The first content reproduction device 11 is compatible with the Internet radio, and therefore can acquire the content source of the content to be reproduced by the user A through the network 2 based on the acquisition source information when the first content reproduction device 11 acquires the acquisition source information relating to the Internet radio from another device. In the same manner, the first content reproduction device 11 is also compatible with the content distribution services A and B, and therefore can acquire the content sources of the content to be reproduced by the user A through the network 2 based on the acquisition source information when the first content reproduction device 11 acquires the acquisition source information relating to the content distribution services A and B from another device. However, in this embodiment, the first content reproduction device 11 is not compatible with the content distribution service C, and therefore cannot acquire the content source of the content included in the content distribution service C even when the first content reproduction device 11 acquires the acquisition source information relating to the content distribution service C from another device. In addition, even when the first content reproduction device 11 can acquire the content source from the USB connected to the first content reproduction device 11, the first content reproduction device 11 cannot acquire the content source from the USB connected to another device, and hence "impossible" is displayed in the correspondence table.

In the fourth column of the correspondence table, it is described whether or not the content can be reproduced based on the acquisition source information when the first content reproduction device 11 acquires the acquisition source information from another device. In this embodiment, the first content reproduction device 11 is compatible with the Internet radio and the content distribution services A and B, and can acquire the content sources based on the acquisition source information received from another device, but the content may fail to be reproduced when the content source is of content having a large size. Therefore, "potentially possible" is displayed as whether or not the reproduction of the content is possible. Even the content source cannot be acquired from the content distribution service C with which the first content reproduction device 11 is not compatible or the USB connected to another device, and the reproduction of the content is impossible. Therefore, "impossible" is displayed in the correspondence table.

In this operation example, the first content reproduction device 11 is compatible with the Internet radio, and therefore can acquire the content source of the musical piece C based on the acquisition source information on the musical piece C received from the second content reproduction device 12. Therefore, the control unit 50 of the first content reproduction device 11 determines that the musical piece C may be able to be reproduced based on the content source of the musical piece C.

Next, a description is made of Step S7 of determining whether or not the reproduction is possible by the first content reproduction device 11, which is illustrated in FIG. 8.

The first content reproduction device 11 actually acquires the content source of the musical piece C from the Internet radio based on the acquisition source information received from the second content reproduction device 12, and attempts to reproduce the content based on the content source. Even when the first content reproduction device 11 successfully acquires the content source of the musical piece C, the acquired content source may be content having such a large size as to inhibit the signal output unit 53 from reproducing the content based on the content source or to cause the content to deteriorate in quality even when the reproduction of the content is possible. In such a case, the control unit 50 of the first content reproduction device 11 determines that the content cannot be reproduced based on the content source of the musical piece C. The description of this operation example is directed to an example in which the reproduction of the content turns out to be possible after the first content reproduction device 11 actually acquires the content source of the musical piece C through the network 2 and the signal output unit 53 attempts to reproduce the content based on the content source.

Next, a description is made of Step S8 of transmitting the child device instruction signal by the first content reproduction device 11, which is illustrated in FIG. 8.

The child device instruction signal is a signal for instructing the second content reproduction device 12 to become the child device with respect to the first content reproduction device 11 and to reproduce a musical piece based on the streaming signal distributed from the first content reproduction device 11. The first content reproduction device 11 transmits the child device instruction signal to the second content reproduction device 12 through the network 2 so that the second content reproduction device 12 becomes the child device. Specifically, the control unit 50 of the first content reproduction device 11 illustrated in FIG. 3 transmits the child device instruction signal to the second content reproduction device 12 through the network 2 via the wireless LAN communication unit 56. In the second content reproduction device 12, the control unit 50 receives the child device instruction signal via the wireless LAN communication unit 56.

Next, a description is made of Step S9 of distribution illustrated in FIG. 8.

The first content reproduction device 11 causes the signal output unit 53 illustrated in FIG. 3 to generate a streaming signal from the content source of the musical piece C. The first content reproduction device 11 distributes the streaming signal of the musical piece C to the second content reproduction device 12 through the network 2. In the second content reproduction device 12, the control unit 50 receives the streaming signal via the wireless LAN communication unit 56, and the control unit 50 instructs the signal output unit 53 to output the streaming signal of the musical piece C.

In this case, there occurs a delay caused by transmitting the streaming signal generated by the first content reproduction device 11 to the second content reproduction device 12 from the first content reproduction device 11 through the network 2. Therefore, the signal output unit 53 of the first content reproduction device 11 reproduces the content via the buffer 54. Meanwhile, the signal output unit 53 of the second content reproduction device 12 reproduces the content by outputting the streaming signal of the musical piece C to the power amplifier 55 not via the buffer 54. That is, the musical piece C is reproduced via the buffer 54 on the first content reproduction device 11 being the parent device, while the musical piece C is reproduced not via the buffer 54 on the second content reproduction device 12 being the child device. With such a configuration, it is possible to cancel out the delay, which is caused by transmitting the streaming signal from the first content reproduction device 11 to the second content reproduction device 12, by a delay caused by reproducing the content on the first content reproduction device 11 via the buffer 54. Therefore, the first content reproduction device 11 and the second content reproduction device 12 can be synchronized with each other. That is, in the living room, the musical piece C is reproduced by the first content reproduction device 11 arranged in the living room, while in the Western-style room, the musical piece C is simultaneously reproduced by the second content reproduction device 12 arranged in the Western-style room.

With the above-mentioned configuration, it is also possible to continuously reproduce the musical piece C by the first content reproduction device 11 in the living room as long as possible even when another user B uses the second content reproduction device 12 to reproduce a musical piece other than the musical piece C in the Western-style room.

That is, with the configuration in which the control unit 50 of the first content reproduction device 11 reproduces the musical piece C by receiving the streaming signal from the second content reproduction device 12 without determining whether or not the musical piece C can be reproduced by itself, it is necessary for the second content reproduction device 12 to generate the streaming signal of the musical piece C and to keep distributing the streaming signal of the musical piece C to the first content reproduction device 11. Therefore, in order for the user B to use the second content reproduction device 12 to reproduce the musical piece other than the musical piece C, it is necessary to cause the second content reproduction device 12 to stop distributing the musical piece C, which inhibits the user A in the living room from reproducing the musical piece C by the first content reproduction device 11.

However, in the configuration of this embodiment, the second content reproduction device 12 transmits the acquisition source information to the first content reproduction device 11, and the control unit 50 of the first content reproduction device 11 determines whether or not the musical piece C can be reproduced based on the acquisition source information. When the control unit 50 determines that the first content reproduction device 11 can acquire the content source of the musical piece C and can reproduce the musical piece C, the first content reproduction device 11 can reproduce the musical piece C without relying on the distribution from the second content reproduction device 12. As a result, even when the another user B uses the second content reproduction device 12 to reproduce the musical piece other than the musical piece C, it is possible to continuously reproduce the musical piece C by the first content reproduction device 11 as long as possible.

In this embodiment, the second content reproduction device 12 is configured to reproduce the musical piece C not via the buffer 54, but the second content reproduction device 12 may be configured to reproduce the musical piece C via the buffer 54. That is, the first content reproduction device 11 and the second content reproduction device 12 may be configured to conduct the reproduction in synchronization with each other through adjustment of a difference between a time period for the delay caused by reproducing the content on the first content reproduction device 11 via the buffer 54 and a time period for the delay caused by reproducing the content on the second content reproduction device 12 via the buffer 54.

Operation Example 2 of Content Reproduction System 10

The description of this operation example is directed to a case where the content source of the musical piece C is content having such a large size as to inhibit the signal output unit 53 of the first content reproduction device 11 from reproducing the content based on the content source or to cause the content to deteriorate in quality even when the reproduction of the content is possible. The basic configuration of the content reproduction system 10 illustrated in FIG. 3 and the operation of from Step S1 of transmitting the favorite list request signal to Step S6 of referring to the correspondence table by the first content reproduction device 11, which are illustrated in FIG. 9, are the same as those of "Operation Example 1 of Content Reproduction System 10", which is described with reference to FIG. 8, and hence descriptions thereof are omitted.

Here, a description is made of Step S7 of determining whether or not the reproduction is possible by the first content reproduction device 11, which is illustrated in FIG. 9.

The first content reproduction device 11 actually acquires the content source of the musical piece C from the Internet radio based on the acquisition source information received from the second content reproduction device 12, and attempts to reproduce the content based on the content source. The first content reproduction device 11 is compatible with the Internet radio, and therefore can acquire the content source of the musical piece C. However, since the content source of the musical piece C is a large size content, the control unit 50 of the first content reproduction device 11 determines that the signal output unit 53 cannot reproduce the content based on the content source or that the signal output unit 53 is not suitable for reproducing the content.

Next, a description is made of Step S10 of transmitting the parent device instruction signal by the first content reproduction device 11, which is illustrated in FIG. 9.

The parent device instruction signal is a signal for instructing the second content reproduction device 12 to become the parent device with respect to the first content reproduction device 11, that is, a signal for instructing the second content reproduction device 12 to generate the streaming signal and to distribute the streaming signal to the first content reproduction device 11. The first content reproduction device 11 transmits the parent device instruction signal to the second content reproduction device 12 through the network 2 so that the second content reproduction device 12 becomes the parent device. Specifically, the control unit 50 of the first content reproduction device 11 illustrated in FIG. 3 transmits the parent device instruction signal to the second content reproduction device 12 through the network 2 via the wireless LAN communication unit 56. In the second content reproduction device 12, the control unit 50 receives the parent device instruction signal via the wireless LAN communication unit 56.

A configuration in which the first content reproduction device 11 notifies the controller 1 that the second content reproduction device 12 has become the parent device is desired when the controller 1 manages the entire content reproduction system 10.

Next, a description is made of Step S11 of distribution, which is illustrated in FIG. 9.

The second content reproduction device 12, which has received the parent device instruction signal, acquires the content source of the musical piece C through the network 2 based on the acquisition source information possessed by itself. The second content reproduction device 12 then causes the signal output unit 53 illustrated in FIG. 3 to generate a streaming signal from the content source of the musical piece C. The second content reproduction device 12 distributes the streaming signal of the musical piece C to the first content reproduction device 11 through the network 2. In the first content reproduction device 11, the control unit 50 receives the streaming signal of the musical piece C from the second content reproduction device 12 via the wireless LAN communication unit 56, and the control unit 50 instructs the signal output unit 53 to output the streaming signal of the musical piece C.

In this case, there occurs a delay caused by transmitting the streaming signal generated by the second content reproduction device 12 to the first content reproduction device 11 from the second content reproduction device 12 through the network 2. Therefore, the signal output unit 53 of the second content reproduction device 12 reproduces the musical piece C via the buffer 54. Meanwhile, the signal output unit 53 of the first content reproduction device 11 reproduces the musical piece C by outputting the streaming signal of the musical piece C to the power amplifier 55 not via the buffer 54. That is, the musical piece C is reproduced not via the buffer 54 on the first content reproduction device 11 being the child device, while the musical piece C is reproduced via the buffer 54 on the second content reproduction device 12 being the parent device. With such a configuration, it is possible to cancel out the delay, which is caused by transmitting the streaming signal from the second content reproduction device 12 to the first content reproduction device 11, by a delay caused by reproducing the musical piece C on the second content reproduction device 12 via the buffer 54. Therefore, the first content reproduction device 11 and the second content reproduction device 12 can conduct the reproduction in synchronization with each other. That is, in the living room, the musical piece C is reproduced by the first content reproduction device 11 arranged in the living room, while in the Western-style room, the musical piece C is simultaneously reproduced by the second content reproduction device 12 arranged in the Western-style room.

In this operation example, the first content reproduction device 11 is configured to reproduce the musical piece C not via the buffer 54, but the first content reproduction device 11 may be configured to reproduce the musical piece C via the buffer 54. That is, the first content reproduction device 11 and the second content reproduction device 12 may be configured to conduct the reproduction in synchronization with each other through adjustment of a difference between a time period for the delay caused by reproducing the content on the first content reproduction device 11 via the buffer 54 and a time period for the delay caused by reproducing the content on the second content reproduction device 12 via the buffer 54.

Operation Example 3 of Content Reproduction System 10

The description of this operation example is directed to a case where the user A selects content of the content distribution service C with which the first content reproduction device 11 is not compatible on the content selection screen illustrated in FIG. 7.

The basic configuration of the content reproduction system 10 illustrated in FIG. 3 and the operation of from Step S1 of transmitting the favorite list request signal to Step S2 of submitting the favorite list, which are illustrated in FIG. 9, are the same as those of "Operation Example 1 of Content Reproduction System 10", which is described with reference to FIG. 8, and hence descriptions thereof are omitted.

Now, a description is made of Step S3 of transmitting the reproduction instruction signal from the controller 1 to the first content reproduction device 11, which is illustrated in FIG. 9.

In this operation example, the user A selects a musical piece E being content included in the favorite list of the second content reproduction device 12 illustrated in FIG. 7. Then, the controller 1 illustrated in FIG. 3 transmits the reproduction instruction signal to the first content reproduction device 11 through the network 2. The reproduction instruction signal is a signal for instructing the first content reproduction device 11 to reproduce content included in the favorite list of the second content reproduction device 12, and includes information indicating which position within the favorite list of the second content reproduction device 12 the content is described in. In this operation example, the reproduction instruction signal includes the information indicating that the musical piece E is described in the third place within the favorite list of the second content reproduction device 12. In the first content reproduction device 11, the control unit 50 receives the reproduction instruction signal via the wireless LAN communication unit 56.

Next, a description is made of Step S4 of transmitting the acquisition source information request signal from the first content reproduction device 11 to the second content reproduction device 12, which is illustrated in FIG. 9.

In this operation example, the acquisition source information is a link destination of the musical piece E on the content distribution service C. The first content reproduction device 11, which has received the reproduction instruction signal from the controller 1, transmits the acquisition source information request signal for requesting the acquisition source information on the content source of the musical piece E to the second content reproduction device 12. Specifically, the control unit 50 of the first content reproduction device 11 illustrated in FIG. 3 transmits the acquisition source information request signal to the second content reproduction device 12 through the network 2 via the wireless LAN communication unit 56. In the second content reproduction device 12, the control unit 50 receives the acquisition source information request signal via the wireless LAN communication unit 56.

Next, a description is made of Step S5 of submitting the acquisition source information from the second content reproduction device 12 to the first content reproduction device 11, which is illustrated in FIG. 9.

The control unit 50 of the second content reproduction device 12, which has received the acquisition source information request signal, extracts the acquisition source information stored in the memory of the control unit 50, and transmits the acquisition source information to the first content reproduction device 11 via the wireless LAN communication unit 56. In the first content reproduction device 11, the control unit 50 receives the acquisition source information via the wireless LAN communication unit 56.

Next, a description is made of Step S6 of referring to the correspondence table by the first content reproduction device 11 and Step S7 of determining whether or not reproduction is possible by the first content reproduction device 11, which are illustrated in FIG. 9.

The first content reproduction device 11, which has acquired the acquisition source information on the musical piece E from the second content reproduction device 12, determines whether or not the reproduction of the musical piece E is possible only on the first content reproduction device 11. That is, the first content reproduction device 11 determines whether or not the first content reproduction device 11 can acquire the content source of the musical piece E and can reproduce the musical piece E from the content source. The first content reproduction device 11 first refers to the correspondence table shown in FIG. 10 to determine whether or not the first content reproduction device 11 can reproduce the musical piece E by itself. The correspondence table is stored in the memory included in the control unit 50.

In this operation example, the first content reproduction device 11 is not compatible with the content distribution service C, and therefore cannot acquire the content source of the musical piece E included in the content distribution service C even when the acquisition source information relating to the content distribution service C is acquired from another device. It should be understood that the first content reproduction device 11 that cannot acquire the content source of the musical piece E cannot reproduce the musical piece E. Therefore, the control unit 50 of the first content reproduction device 11 determines that the musical piece E cannot be reproduced based on the correspondence table without attempting to acquire the content source of the musical piece E. In this manner, Step S6 of referring to the correspondence table by the first content reproduction device 11 and Step S7 of determining whether or not the reproduction is possible by the first content reproduction device 11, which are illustrated in FIG. 9, are conducted.

Next, a description is made of Step S10 of transmitting a parent device instruction signal by the first content reproduction device 11, which is illustrated in FIG. 9.

The parent device instruction signal is a signal for instructing the second content reproduction device 12 to become the parent device with respect to the first content reproduction device 11, that is, a signal for instructing the second content reproduction device 12 to generate the streaming signal and to distribute the streaming signal to the first content reproduction device 11. The first content reproduction device 11 transmits the parent device instruction signal to the second content reproduction device 12 through the network 2 so that the second content reproduction device 12 becomes the parent device. Specifically, the control unit 50 of the first content reproduction device 11 illustrated in FIG. 3 transmits the parent device instruction signal to the second content reproduction device 12 through the network 2 via the wireless LAN communication unit 56. In the second content reproduction device 12, the control unit 50 receives the parent device instruction signal via the wireless LAN communication unit 56.

A configuration in which the first content reproduction device 11 notifies the controller 1 that the second content reproduction device 12 has become the parent device is desired when the controller 1 manages the entire content reproduction system 10.

Next, a description is made of Step S11 of distribution, which is illustrated in FIG. 9.

The second content reproduction device 12, which has received the parent device instruction signal, acquires the content source of the musical piece E through the network 2 based on the acquisition source information possessed by itself. The second content reproduction device 12 causes the signal output unit 53 illustrated in FIG. 3 to generate a streaming signal from the content source of the musical piece E. The second content reproduction device 12 distributes the streaming signal of the musical piece E to the first content reproduction device 11 through the network 2. In the first content reproduction device 11, the control unit 50 receives the streaming signal of the musical piece E from the second content reproduction device 12 via the wireless LAN communication unit 56, and the control unit 50 instructs the signal output unit 53 to output the streaming signal of the musical piece E.

In this case, there occurs a delay caused by transmitting the streaming signal generated by the second content reproduction device 12 to the first content reproduction device 11 from the second content reproduction device 12 through the network 2. Therefore, the signal output unit 53 of the second content reproduction device 12 reproduces the musical piece E via the buffer 54. Meanwhile, the signal output unit 53 of the first content reproduction device 11 reproduces the musical piece E by outputting the streaming signal of the musical piece E to the power amplifier 55 not via the buffer 54. That is, the musical piece E is reproduced not via the buffer 54 on the first content reproduction device 11 being the child device, while the musical piece E is reproduced via the buffer 54 on the second content reproduction device 12 being the parent device. With such a configuration, it is possible to cancel out the delay, which is caused by transmitting the streaming signal from the second content reproduction device 12 to the first content reproduction device 11, by a delay caused by reproducing the musical piece E on the second content reproduction device 12 via the buffer 54. Therefore, the first content reproduction device 11 and the second content reproduction device 12 can be synchronized with each other. That is, in the living room, the musical piece E is reproduced by the first content reproduction device 11 arranged in the living room, while in the Western-style room, the musical piece E is simultaneously reproduced by the second content reproduction device 12 arranged in the Western-style room.

In this operation example, the first content reproduction device 11 is configured to reproduce the musical piece E not via the buffer 54, but the first content reproduction device 11 may be configured to reproduce the musical piece E via the buffer 54. That is, the first content reproduction device 11 and the second content reproduction device 12 may be configured to conduct the reproduction in synchronization with each other through adjustment of a difference between a time period for the delay caused by reproducing the content on the first content reproduction device 11 via the buffer 54 and a time period for the delay caused by reproducing the content on the second content reproduction device 12 via the buffer 54.

What is claimed is:
1. A content reproduction device, comprising:
   at least one processor; and at least one memory device that stores a plurality of instructions, which when executed by the at least one processor, causes the at least one processor to:
  receive, from a second content reproduction device connected through a network, acquisition source information on content included in a playlist of the second content reproduction device; and
  determine whether or not reproduction of the content is possible,
wherein the plurality of instructions causes the at least one processor to:
  acquire a content source based on the acquisition source information,
  reproduce the content based on the content source,
  generate a streaming signal based on the content source, and
  transmit the streaming signal to the second content reproduction device.

2. The content reproduction device according to claim 1, further comprising a buffer,
wherein the content reproduction device is configured to reproduce the content via the buffer, to thereby synchronize the reproduction of the content with the reproduction of the content being conducted by the second content reproduction device.

3. The content reproduction device according to claim 1, wherein:
  the plurality of instructions causes the at least one processor to:
    transmit a parent device instruction signal to the second content reproduction device, and
    receive a streaming signal of the content, which is generated by the second content reproduction device, and
    output the streaming signal.

4. A content reproduction system, comprising:
  a first content reproduction device comprising a first playlist; and
  a second content reproduction device comprising a second playlist and connected to the first content reproduction device through a network,
  wherein
    the first content reproduction device comprises:
      at least one processor; and
      at least one memory device that stores a plurality of instructions, which when executed by the at least one processor, causes the at least one processor to:
        receive acquisition source information on content included in the second playlist from the second content reproduction device,
        determine whether or not reproduction of the content is possible,
        acquire a content source based on the acquisition source information,
        reproduce the content based on the content source,
        generate a streaming signal based on the content source, and
        transmit the streaming signal to the second content reproduction device.

5. The content reproduction system according to claim 4, wherein the second content reproduction device is configured to:
  receive the streaming signal; and
  output the streaming signal.

6. The content reproduction system according to claim 4, wherein:
  the first content reproduction device is configured to transmit a parent device instruction signal to the second content reproduction device, and
  the second content reproduction device is configured to:
    acquire a content source based on the acquisition source information; and
    generate a streaming signal based on the content source.

7. The content reproduction system according to claim 6, wherein the second content reproduction device is configured to transmit the streaming signal to the first content reproduction device.

8. The content reproduction system according to claim 7, wherein:
  the plurality of instructions causes the at least one processor to:
    receive the streaming signal; and
    output the streaming signal.

9. The content reproduction system according to claim 6, wherein:
  the second content reproduction device comprises a buffer; and
  the second content reproduction device is configured to reproduce the content via the buffer, to thereby synchronize the reproduction of the content being conducted by the second content reproduction device with the reproduction of the content being conducted by the first content reproduction device.

10. A content reproduction system, comprising:
  a first content reproduction device comprising a first playlist; and
  a second content reproduction device comprising a second playlist and connected to the first content reproduction device through a network,
  wherein:
    the first content reproduction device comprises:
      at least one processor; and
      at least one memory device that stores a plurality of instructions, which when executed by the at least one processor, causes the at least one processor to:
        receive acquisition source information on content included in the second playlist from the second content reproduction device,
        determine whether or not reproduction of the content is possible,
    the first content reproduction device further comprises a buffer, and
    the first content reproduction device is configured to reproduce the content via the buffer, to thereby synchronize the reproduction of the content being conducted by the first content reproduction device with the reproduction of the content being conducted by the second content reproduction device.

11. A content reproduction system, comprising:
  a first content reproduction device comprising a first playlist; and
  a second content reproduction device comprising a second playlist and connected to the first content reproduction device through a network,
  wherein:
    the first content reproduction device comprises:
      at least one processor; and
      at least one memory device that stores a plurality of instructions, which when executed by the at least one processor, causes the at least one processor to:

receive acquisition source information on content included in the second playlist from the second content reproduction device, determine whether or not reproduction of the content is possible, the second content reproduction device comprises a buffer, and the second content reproduction device is configured to reproduce the content via the buffer, to thereby synchronize the reproduction of the content being conducted by the second content reproduction device with the reproduction of the content being conducted by the first content reproduction device.

12. A control method for a content reproduction device comprising the acts of:

receiving, from a second content reproduction device connected through a network, acquisition source information on content included in a playlist of the second content reproduction device;

determining whether or not reproduction of the content is possible;

acquiring a content source based on the acquisition source information;

reproducing the content based on the content source;

generating a streaming signal based on the content source; and transmitting the streaming signal to the second content reproduction device.

13. A control method for a content reproduction device comprising the acts of:

receiving, from a second content reproduction device connected through a network, acquisition source information on content included in a playlist of the second content reproduction device;

determining whether or not reproduction of the content is possible;

transmitting a parent device instruction signal to the second content reproduction device;

receiving a streaming signal of the content, which is generated by the second content reproduction device; and outputting the streaming signal.

14. A control method for a content reproduction device comprising the acts of:

receiving, from a second content reproduction device connected through a network, acquisition source information on content included in a playlist of the second content reproduction device;

determining whether or not reproduction of the content is possible;

reproducing the content via a buffer, to thereby synchronize the reproduction of the content with the reproduction of the content being conducted by the second content reproduction device.

* * * * *